United States Patent Office 3,770,817
Patented Nov. 6, 1973

3,770,817
ALKYLAMINOALKYLSULFINIC ACID SALTS
Erwin Gams, Istvan Namenyi, Helmut Wahlig, Dietrich Erdmann, and Wolfgang Koch, Darmstadt, Germany, assignors to Merck Patent Gesellschaft mit beschrankter Haftung, Darmstadt, Germany
No Drawing. Filed July 10, 1970, Ser. No. 53,977
Claims priority, application Germany, July 12, 1969, P 19 35 457.5
Int. Cl. C07c *145/00*
U.S. Cl. 260—513.7     10 Claims

ABSTRACT OF THE DISCLOSURE

Alkylaminoalkylsulfinic acid salts of the formula $$R—C_nH_{2n}—SO_2M$$

wherein R is a secondary or tertiary amino group containing 1–4 N-atoms and 8–40 C-atoms, at least one of which N-atoms is an amino group substituted by an alkyl group containing 8–18 carbon atoms; $n$ is 1–6; and M is H or a metal or ammonium ion, have bacteriocidal, fungicidal and algicidal activity and are useful as disinfecting and cleansing agents.

SUMMARY OF THE INVENTION

This invention relates to novel alkylaminoalkylsulfinic acids and salts thereof of the formula $$R—C_nH_{2n}—SO_2M \quad (I)$$

wherein R represents a secondary or tertiary amino group derived from a straight-chain or branched saturated aliphatic amine or polyamine, containing in total 1–4 amino N-atoms and 8–40 C-atoms, at least one of which amino N-atoms is substituted by an alkyl group of 8–18 carbon atoms; $n$ is an integer of 1–6, inclusive; and M is H or an equivalent of a metal or ammonium ion, having germicidal and fungicidal activity.

DETAILED DISCUSSION

Of the alkylaminoalkylsulfinic acid salts of Formula I, preferred are those of any of Formulae Ia through Ip, wherein R and $n$ have the meanings indicated in Formula I and M preferably is a metal or ammonium salt, and wherein residues or indices $R_1$, $R_2$, $m$ and $p$ occurring several times within the same molecule can be identical or different from one another:

(Ia)
$$R_1—(NR_2—C_mH_{2m})_p—NR_2—C_nH_{2n}—SO_2M$$

wherein $R_1$ is alkyl of 8–18 carbon atoms, preferably of even number; $R_2$ is H, alkyl of 1–18 carbon atoms or $R_1—(NR_2—C_mH_{2m})_p$, preferably H; $m$ is an integer of 2–6, inclusive, preferably 2 or 3; and $p$ is an integer of 0–3, inclusive, preferably 0–2;

(Ib)
$$R_1—(NH—C_mH_{2m})_p—NR_3—C_nH_{2n}—SO_2M$$

wherein $R_3$ is H or $R_1—(NH—C_mH_{2m})_p$, and $R_1$, $m$ and $p$ have the meanings given for Formula Ia;

(Ic) $R_1—(NH—C_mH_{2m})_p—NH—C_nH_{2n}—SO_2M$ (Ib; $R_3$ is H);
(Id) $R_1—NH—(CH_2)_m—NH—C_nH_{2n}—SO_2M$ (Ic; $p$ is 1);
(Ie) $R_1—NH—C_nH_{2n}—SO_2M$ (Ic; $p$ is 0);
(If) $R_1—(NR_2—C_mH_{2m})_p—NR_2—CH_2—SO_2M$ (Ia; $n$ is 1);
(Ig) $R_1—(NH—C_mH_{2m})_p—NR_3—CH_2—SO_2M$;
(Ih) $R_1—(NH—C_mH_{2m})_p—NH—CH_2—SO_2M$;
(Ii) $R_1—NH—(CH_2)_m—NH—CH_2—SO_2M$;
(Ij) $R_1—NH—CH_2—SO_2M$;
(Ik) $R_1—(NR_2—C_mH_{2m})_p—NR_2—CH_2—SO_2Na$ (If; M is Na);
(Il) $R_1—(NH—C_mH_{2m})_p—NR_3—CH_2—SO_2Na$; (Ig; M is Na);
(Im) $R_1—(NH—C_mH_{2m})_p—NH—CH_2—SO_2Na$ (Ih; M is Na);
(In) $R_1—NH—(CH_2)_m—NH—CH_2—SO_2Na$ (Ii; M is Na);
(Io) $R_1—NH—CH_2—SO_2Na$ (Ij; M is Na);
(Ip) $R_4—NH—(CH_2)_3—NH—CH_2—SO_2Na$ (Ii; $m$ is 3, M is Na and $R_1$ is $R_4$), wherein $R_4$ is dodecyl or the mixture of alkyl groups of 8–18 carbon atoms (denoted "coco" below) of the amines of the natural, commercially available coconut oil amine.

Of the salts of Formulae I and Ia–Ij of this invention, the alkali-metal salts, especially the sodium salts, are preferred. M can also be another metal ion, for example, K, Ca, Ba, Cu, Zn, Cd, Pb, Sn, or ammonium (—NH$_4$), or optionally substituted ammonium, e.g., pyridinium, mono-, di-, or triethanolammonium, mono-, di-, trimethylammonium, mono-, di-, tri-ethylammonium, mono-, dicyclohexylammonium and piperidinium.

Of the compounds of Formulae Ia–Ip, especially preferred are those of Formula Ih wherein $m$ is 2 or 3, $p$ is 0–2 and $R_1$ is alkyl containing 8–18 carbon atoms, inclusive, particularly those wherein M is Na, including mixtures of such compounds wherein the number of carbon atoms in $R_1$ varies from 8–18.

According to the process aspect of this invention, alkylaminoalkylsulfinic acid salts of Formula I are produced by the reaction in an aqueous medium, of an amine of the formula R—H (II) with a sulfinic acid salt of the formula X—$C_nH_{2n}$—SO$_2$M (III) wherein R, $n$ and M have the values given above and X represents a free or, optionally, a functionally modified OH-group, or Cl, Br or I.

Examples of amines of Formula II which can be employed are octylamine, dodecylamine, palmitylamine (hexadecylamine), stearylamine (octadecylamine), dodecylaminoethylamine, dodecylaminopropylamine, dodecylaminopolyethyleneaminoethylamines, dodecylaminopolypropyleneaminopropylamines, diododecyldiethylenetriamine $$(C_{12}H_{25}NHCH_2CH_2NHCH_2CH_2NHC_{12}H_{25})$$

"coco-amine," the natural coconut oil amine mixture, (a mixture of primary amines of the general formula -coco-NH$_2$ wherein "coco" residue consists approximately 50% of —$C_{12}H_{25}$), and 3-"coco-amino"-propylamine. Commercially available products consisting essentially of amines of Formula II are the "Duomeen" amines (Armour Indust. Chem. Co.) which are a series of N-alkyl trimethylenediamines in which the alkyl groups range from C$_8$ to S$_{18}$ and are amine derivatives of coco, soya and tallow fatty acids.

Examples of sulfinic acid salts of Formula III which can be employed are the metal and ammonium salts, especially the sodium salt, of hydroxymethanesulfinic acid, of 1-hydroxyethanesulfinic acid, of 2 - chloroethanesulfinic acid, of 1 - hydroxypropanesulfinic acid and of 1-hydroxybutanesulfinic acid.

To prepare the compounds of this invention, preferably equimolar amounts of a compound of Formula I and of Formula II are agitated in an aqueous solution preferably at a pH of between 7 and 9 for several hours, preferably at an elevated temperature, e.g., 40–80° C. A compound of this invention can be isolated from the reaction solution by evaporation. They are obtained as colorless viscous-oily substances which can be characterized by elementary analysis, as well as by their infrared and nuclear magnetic resonance spectra. According to their infrared spectra, the final products do not contain any primary amino groups. The presence of the sulfinic acid groups can be proven by oxidizing agents.

The free acids of this invention can be produced by dissolving the corresponding metal salt, e.g., Na salt, in alcohol and adding a stoichiometric amount of anhydrous metanolic hydrogen chloride solution thereto, precipitating the NaCl by the addition of ether, acetone or other nonpolar solvent in which the free acid is soluble, removing the precipitate and evaporating the solvent. They can also be produced by passing an aqueous solution of the corresponding Na salt, through a strongly acidic ion exchange column, employing conventional procedures. The free acids are useful for characterization, isolation and purification purposes, for converting one salt form into another salt form, and for disinfection of areas where a more permament deposit of the disinfecting agent is desired.

The reaction solutions can also be employed as such, as disinfectants and cleansing agents, optionally after dilution, for example with 65–99% by volume of water and/or preferably with 5–20% by volume of an alcohol of 1–4 carbon atoms, e.g., methanol, ethanol, n-propanol, isopropanol, n-butanol or isobutanol.

The compounds of this invention exhibit a pronounced germicidal effect against both Gram-positive and Gram-negative bacteria. This activity and their good surface-active properties make them well suited for use as disinfectants and cleansing agents. For example, various strains of bacteria (*Escherichia coli, Pseudomonas aeruginosa, Staphylococcus aureus*) all were killed at 22° C. within one minute with a 0.0005% aqueous solution of the sodium salt of 3 - dodecylaminopropylaminomethylsulfinic acid. Under identical conditions, the killing times against these organisms of a 0.005% aqueous solution of the sodium salt of dodecylaminoethylaminoacetic acid (a commercial preparation similar in structure) were 30, 2, and 10 minutes, respectively.

Compared to the bactericidally effective "invert soaps" (long-chain quaternary ammonium compounds), the compounds of Formula I have a higher cleaning power and, additionally, are compatible with anionic soaps and with protein.

The compounds of Formula I also exhibit fungicidal effects, for example, against dermatophytes, e.g., *Trichophyton mentagrophytes*, yeast fungi, e.g., *Candida albicans* and *Histoplasma capsulatum,* and molds, e.g., *Aspergillus niger,* and algicidal effects, e.g., against organisms of the general Anacystis, Ankistrodesmus, Bangia, Chara, Chlamydomonas, Chlorella, Cladophora, Cosmarium, Ectocarpus, Euglena, Navicula, Nostoc, Oscillatoria, Scenedesumus, Spirogyra, Stichococcus, Vaucheria. They therefore can also be employed as fungicidal and/or algicidal agents. In particular, the sodium salt of 3-dodecylaminopropylaminomethylsulfinic acid exhibited satisfactory algicidal effects against *Ankistrodesmus braunii, Chlorella pyrenoidosa, Scenedesmus obliquus,* and *Stichococcus bacillaris.* The algicidal effectiveness of the compounds of this invention is of the same order of magnitude as their bactericidal effectiveness. Therefore, they can especially advantageously be employed as swimming pool algicides, since it is unnecessary to simultaneously add further disinfectants, e.g., chlorinated lime.

The algicidal effect can be determined according to the following methods:

(a) Agar Plate Test 1 ml. of the solution of the effective agent is pipetted on a sterile filter, and the latter is placed on a Petri dish containing still warm nutrient agar composition formed from 1 g. of $Ca(NO_3)_2$, 0.25 g. of $MgSO_4 \cdot 7H_2O$, 0.25 g. of $KH_2PO_4$, 0.25 g. of $KNO_3$, 0.02 g. of $FeSO_4$, 30 g. of agar and 3,000 ml. of water. After cooling, one drop of a suspension of the selected alga is placed thereon and the specimen kept for 7 days under artifical light and then evaluated. In control tests, intensely green spots are formed at the places where the drop was placed.

(b) Shaking Test 20 ml. of the same sterilized nutrient solution used in the Agar Plate Test, except with the agar omitted, is mixed with 0.2 ml. of an aqueous solution of a compound of this invention and then with a slurry of about $10^6$ cells of the selected alga in 1 ml. of water. Thereafter, the solution is shaken in daylight for 7 days at 22° C. with the admission of air, on a vibrator table with 80 movements per minute. Then the number of alga cells are counted.

The sulfinic acid salts according to this invention exhibit its full bactericidal effect after several months storage. The corresponding sulfonic acid salts, which are possible oxidation products of sulfinic acid salts, are less active by powers of ten.

A composition aspect of this invention relates to disinfectants and cleansing agents containing at least one compound of Formula I. These agents are preferably employed in a liquid composition although they can also be incorporated into solid and aerosol compositions. They are particularly useful in situations where, in addition to thorough disinfection, is desirable for the disinfecting composition to be a cleansing agent. This latter property is a valuable characteristic of the compounds of this invention.

A method of use aspect of this invention involves the use of a compound of this invention to disinfect surfaces, both animate and inanimate. The compounds of this invention are generally suitable for disinfecting the human skin and the skin of animals, e.g., cattle, as well as for the disinfection of environmental areas, surfaces and objects, for example, glass, porcelain, earthenware, wood, metal, plastics, walls, floors, air and water. In particular, they are well suitable for disinfecting the hands, for disinfecting medical appliances, e.g., surgical instruments, or for disinfecting sanitary installations. They also can be employed during the processing, packaging and/or transporting of foodstuffs, e.g., to disinfect pipelines in foodstuff plants, milk cans or milk bottles.

As disinfectants and cleansing agents, the compounds of this invention are preferably employed as aqueous or aqueous-alcoholic concentrates, e.g., which contain 0.1 to 20% of a compound of this invention, especially an alkali metal salt thereof. Such compositions can be diluted to an effective lower concentration, e.g., to a concentration of about 0.001 to 0.05%, preferably 0.005%. Even higher dilutions are bactericidally effective. The pH of the concentration can be adjusted, if required, by the addition of acids, bases, or buffers, preferably to a pH of between 7 and 12, more preferably between 8 and 9.

The disinfectants and cleansing agents according to this invention can also contain additional agents conventionally employed in cleansing and/or disinfecting compositions. For example, liquid detergents or wetting agents can be added, if required, such as, for example, anionic soaps, e.g., fatty alcohol sulfates, or fatty alcohol sulfonates. The effective agents of Formula I can also be incorporated into solid soaps, wetting agents and detergents. Furthermore, the detergent and cleansing agents of this invention can also contain one or more of the following: thickeners, e.g., cellulose ethers, such as, for example, methylcellulose or carboxymethylcellulose, tragacanth, alginates, agar and gum arabic; emulsifiers, e.g., condensation products of ethylene oxide and castor oil, sulfosuccinates, such as, for example, dioctyl sodium sulfosuccinate, sorbitan fatty acid esters and polyoxyethylene-sorbitan fatty acid esters; moisture conditioners, e.g., glycerin and sorbitol; chelating agents, e.g., salts of ethylenediaminetetraacetic acid; softening agents, e.g., polyphosphates; builders; coloring agents; and perfumes.

Example 1

92.6 g. of dodecylamine are stirred in 1 liter of water with 59 g. of the sodium salt of hydroxymethanesulfinic acid for 4 hours at 60° C. The water is distilled off, the residue taken up in chloroform, dried with sodium sulfate and, after filtration, evaporated to dryness. The sodium salt of dodecylaminomethylsulfinic acid (100 g.) is obtained as a colorless product having the composition $C_{13}H_{28}NNaO_2S$. Elementary analysis: S, 11.5% (calculated: 11.2%).

In the same manner, reacting the sodium salt of hydroxymethanesulfinic acid with octylamine, nonylamine, decylamine, undecylamine, tridecylamine, tetradecylamine, pentadecylamine, hexadecylamine, heptadecylamine and octadecylamine, the sodium salts of the following acids are obtained:

octylaminomethylsulfinic acid;
nonylaminomethylsulfinic acid;
decylaminomethylsulfinic acid;
undecylaminomethylsulfinic acid;
tridecylaminomethylsulfinic acid;
tetradecylaminomethylsulfinic acid;
pentadecylaminomethylsulfinic acid;
hexadecylaminomethylsulfinic acid;
heptadecylaminomethylsulfinic acid; and
octadecylaminomethylsulfinic acid; respectively.

In an analogous manner, the sodium salts of the mixture of coco-amino-methylsulfinic acids are obtained starting with the natural coconut oil amine mixture (cocoamine).

Example 2

(a) 12 g. of 3-dodecylaminopropylamine are stirred in 250 ml. of water with 5.9 g. of the sodium salt of hydroxymethanesulfinic acid for 4 hours at 60° C. After the water has been distilled off, the reaction mixture is dissolved in chloroform, dried with sodium sulfate, and, after filtration, evaporated to dryness, thus obtaining 12 g. of the sodium salt of 3-dodecylaminopropylaminomethylsulfinic acid as a colorless oily substance having the composition $C_{16}H_{35}N_2NaO_2S$. Sulfinic acid content: 16.2% as $SO_2$ (calculated: 16.55%). Nuclear magnetic resonance spectrum: signal for two protons at $\delta=3.7$ p.p.m.

Analogously, the sodium salts of the acids set forth below are obtained by the reaction of the sodium salt of hydroxymethanesulfinic acid with 2-dodecylaminoethylamine, 3-octylaminopropylamine, 3-octadecylaminopropylamine, 2-(2-dodecylaminopropylamine)-ethylamine, 3-(3-dodecylaminopropylamino) - propylamine, 2-[2-(2-dodecylaminoethylamino)-ethylamino]-ethylamine, and 2-[2-(2-octadecylaminoethylamino) - ethylamino]-ethylamine, respectively:

2-dodecylaminoethylaminomethylsulfinic acid;
3-octylaminopropylaminomethylsulfinic acid;
3-octadecylaminopropylaminomethylsulfinic acid;
2-(2-dodecylaminopropylamino)-ethylaminomethylsulfinic acid;
3-(3-dodecylaminopropylamino)-propylaminomethylsulfinic acid;
2-[2-(2-dodecylaminoethylamino)-ethylamino]-ethylaminomethylsulfinic acid; and
2-[2-(2-octadecylaminoethylamino)-ethylamino]-ethylaminomethylsulfinic acid.

(b) 10 g. of the sodium salt of 3-dodecylaminopropylaminomethylsulfinic acid obtained in accordance with (a) are dissolved in 100 ml. of 40% aqueous isopropanol. The solution is poured over a column of 7 g. of a strongly acidic cation exchanger (e.g., E. Merck Ion Exchanger I). The eluate, containing the 3-dodecylaminopropylaminomethylsulfinic acid, is allowed to flow into a solution of a stoichiometric amount of pyridine in 20 ml. of 40% isopropanol. After evaporation, 10 g. of the pyridinium salt of 3-dodecylaminopropylaminomethylsulfinic acid is obtained.

Analogously, adding the eluate to stoichiometric amounts of other bases, e.g., ammonia, piperidine, triethanolamine, and potassium hydroxide, the corresponding salts are produced, e.g., the ammonium salt, the piperidinium salt, the triethanolammonium salt, and the potassium salt of 3-dodecylaminopropylaminomethylsulfinic acid, respectively.

Example 3

10.25 g. of cocotrimethylenediamine ("Duomeen C") are stirred in 100 ml. of water with 5 g. of the sodium salt of hydroxymethanesulfinic acid for 4 hours at 50° C. The reaction solution (A) is evaporated, dissolved in chloroform, dried over $Na_2SO_4$, filtered, and evaporated. There is thus obtained a mixture of the sodium salts of the 3-cocoaminopropylaminomethylsulfinic acids as a colorless oily substance having a sulfinic acid content of 15.5% $SO_2$. Nuclear resonance spectrum: signal for 2 protons at $\delta=3.7$ p.p.m.

Analogously, reacting cocotrimethylenediamine with the sodium salt of 1-hydroxyethane-1-sulfinic acid, 1-hydroxypropane-1-sulfinic acid, 1-hydroxybutane-1-sulfinic acid, 1-hydroxypentane-1-sulfinic acid, 1-hydroxyhexane-1-sulfinic acid, 2-hydroxy- (or 2-chloro- or 2-bromo-) ethane-1-sulfinic acid, 3-hydroxy- (or 3-chloro- or 3-bromo-)propane-1-sulfinic acid, 4-hydroxy- (or 4-chloro- or 4-bromo-)butane-1-sulfinic acid, 5-hydroxy- (or 5-chloro- or 5-bromo-)pentane-1-sulfinic acid, and of 6-hydroxy- (or 6-chloro- or 6-bromo-)hexane-1-sulfinic acid, respectively, the sodium salts of the following acids are obtained:

1-(3-coco-amino-propylamino)-ethane-1-sulfinic acid;
1-(3-coco-amino-propylamino)-propane-1-sulfinic acid;
1-(3-coco-amino-propylamino)-butane-1-sulfinic acid;
1-(3-coco-amino-propylamino)-pentane-1-sulfinic acid;
1-(3-coco-amino-propylamino)-hexane-1-sulfinic acid;
2-(3-coco-amino-propylamino)-ethane-1-sulfinic acid;
3-(3-coco-amino-propylamino)-propane-1-sulfinic acid;
4-(3-coco-amino-propylamino)-butane-1-sulfinic acid;
5-(3-coco-amino-propylamino)-pentane-1-sulfinic acid; and
6-(3-coco-amino-propylamino)-hexane-1-sulfinic acid.

Example 4

20.4 g. of 2-(2-dodecylaminoethylamino)-ethylamine (dodecyldiethylenetriamine) are stirred in 250 ml. of water with 8.8 g. of the sodium salt of hydroxymethanesulfinic acid for 4 hours at 60° C. The water is distilled off and the distillation residue is dissolved in chloroform, dried with sodium sulfate, and, after filtration, evaporated to dryness. There is thus obtained 23 g. of the sodium salt of 2-(2-dodecylaminoethylamino)-ethylaminomethylsulfinic acid as a colorless oily substance having the composition $C_{17}H_{38}N_3NaO_2S$. Elementary analysis: N, 11.1% (calculated: 11.3%); S, 8.5% (calculated: 8.6%).

Example 5

21.95 g. of bis-(2-dodecylaminoethyl)-amine (didodecyldiethylenetriamine) are stirred in 300 ml. of water with 5.9 g. of the sodium salt of hydroxymethanesulfinic acid for 4 hours at 60° C. The water is distilled off and the residue is taken up in chloroform, dried with sodium sulfate, and evaporated to dryness. There is thus obtained 24 g. of a mixture of the sodium salts of bis-(2-dodecylaminoethyl)-aminomethylsulfinic acid and N-dodecyl - N - [2 - (2 - dodecylaminoethylamino)-ethyl]- aminomethylsulfinic acid as a colorless oily substance having the composition $C_{29}H_{62}N_3NaO_2S$. Elementary analysis: N, 7.9% (calculated: 7.8%); S, 5.6% (calculated: 5.9%).

EXAMPLES OF THE USE OF THE NOVEL COMPOUNDS

Example A

The reaction solution (A) obtained according to Example 3 is mixed with 10 ml. of isopropanol and, in this form, can be directly employed as a disinfecting and cleansing concentrate. The content of sodium salts of the 3-coco-amino-propylaminomethylsulfinic acids is about 12%. This concentrate can be diluted as required.

Example B 20 parts by weight of sodium salts of the 3-coco-aminopropylaminomethylsulfinic acids were dissolved in a mixture of 20 parts by weight of isopropanol and 60 parts by weight of water. This solution can be diluted as required and can then be employed in the usual manner, for example also by spraying, as a disinfectant and cleansing agent.

The formulations set forth below are obtained by mixing the listed components (the numerical values are parts by weight):

Example C.—Disinfecting all-purpose cleansing agent (concentrate)

| | |
|---|---|
| Sodium salt of dodecylaminomethylsulfinic acid | 10 |
| Sodium lauryl sulfate | 5 |
| Oleic acid diethanol amide | 1 |
| Sodium salt of ethylenediaminetetraacetic acid | 0.3 |
| Isopropanol | 20 |
| Water | 63.7 |

Example D.—Disinfecting hand washing agent

| | |
|---|---|
| Sodium salt of 3-dodecylaminopropylaminomethylsulfinic acid | 0.5 |
| Sodium-N-lauroyl methyl tauride | 10 |
| Sodium-N-lauroyl sarcosinate | 10 |
| Glycerin | 2 |
| Water | 77.5 |

Example E.—Disinfecting rinsing agent (concentrate)

| | |
|---|---|
| Sodium salts of the 3-coco-amino-propylaminomethylsulfinic acids | 10 |
| Dodecylbenzenesulfonate (triethanolamine salt) | 2.5 |
| Nonylphenol polyglycol ether | 1 |
| Ethanol | 10 |
| Water | 76.5 |

Example F.—Disinfecting washing agent (concentrate)

| | |
|---|---|
| Sodium salt of 2-(2-dodecylaminoethylamino)-ethylaminomethylsulfinic acid | 15 |
| Fatty alcohol polyglycol ether | 5 |
| Triethanolamine lauryl sulfate | 10 |
| Coconut fatty acid diethanolamide | 2 |
| Isopropanol | 15 |
| Water | 53 |

The preceding examples can be repeated with similar success by substituting the generally and specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A compound of the formula $$R_1-NH-C_mH_{2m}-NH-CH_2-SO_2Na$$

wherein $m$ is 2 or 3 and $R_1$ is alkyl of 8–18 carbon atoms.

2. A compound of the formula $$R_1-NH-C_mH_{2m}-NH-C_mH_{2m}-NH-CH_2SO_2Na$$

wherein $m$ is 2 or 3 and $R_1$ is alkyl of 8–18 carbon atoms.

3. A compound of claim 1 wherein $R_1$ is a mixture of alkyl residues of 8–18 carbon atoms of coconut oil amines.

4. The compound of claim 1, the sodium salt of 2-dodecylaminoethylaminomethylsulfinic acid.

5. The compound of claim 1, the sodium salt of 3-dodecylaminopropylaminomethylsulfinic acid.

6. The compound of claim 2, the sodium salt of 2-(2-dodecylaminoethylamino)-ethylaminomethylsulfinic acid.

7. The compound of claim 2, the sodium salt of 3-(3-dodecylaminopropylamino) - propylaminomethylsulfinic acid.

8. The compound of claim 1, the sodium salt of 3-coco-amino-propylaminomethylsulfinic acid.

9. A compound of claim 1 of the formula $$R_1-NH(CH_2)_m-NH-CH_2SO_2Na$$

wherein $R_1$ and $m$ have the values given therein.

10. A compound of claim 1 of the formula $$R_4-NH(CH_2)_3-NH-CH_2-SO_2Na$$

wherein $R_4$ is dodecyl or the mixture of alkyl groups of 8–18 carbon atoms of coconut oil amine.

References Cited
UNITED STATES PATENTS 2,146,280   2/1939   Adams _____ 260—513.7

DANIEL D. HORWITZ, Primary Examiner

U.S. Cl. X.R.

252—106; 424—335, 267; 260—293.87; 71—67

UNITED STATES PATENT OFFICE
CERTIFICATE OF CORRECTION

Patent No. 3,770,817  Dated November 6, 1973

Inventor(s) Erwin Gams, et al.

It is certified that error appears in the above-identified patent and that said Letters Patent are hereby corrected as shown below:

COLUMN 1, IN THE HEADING: Under "Claims Priority", should read

-- Germany, July 12, 1969, P 19 35 457.5 and

Germany, March 20, 1970, P 20 13 375.9 --.

Signed and sealed this 23rd day of April 1974.

(SEAL)
Attest:

EDWARD M. FLETCHER, JR.
Attesting Officer

C. MARSHALL DANN
Commissioner of Patents